US009376091B2

(12) United States Patent
Ennis et al.

(10) Patent No.: US 9,376,091 B2
(45) Date of Patent: Jun. 28, 2016

(54) CONVEYOR SYSTEM

(71) Applicant: G. Thomas Ennis, Inglewood, CA (US)

(72) Inventors: G. Thomas Ennis, Inglewood, CA (US); Alex Chavez, Hesperia, CA (US)

(73) Assignee: G. Thomas Ennis, Inglewood, CA (US)

( * ) Notice: Subject to any disclaimer, the term of this patent is extended or adjusted under 35 U.S.C. 154(b) by 0 days.

(21) Appl. No.: 14/933,873

(22) Filed: Nov. 5, 2015

(65) Prior Publication Data

US 2016/0137171 A1 May 19, 2016

Related U.S. Application Data

(60) Provisional application No. 62/076,393, filed on Nov. 6, 2014.

(51) Int. Cl.
*B61J 3/04* (2006.01)
*B65G 19/20* (2006.01)
*B60S 3/00* (2006.01)

(52) U.S. Cl.
CPC ............... *B60S 3/004* (2013.01); *B65G 19/205* (2013.01)

(58) Field of Classification Search
CPC ............ B61J 3/04; B61B 13/12; B65G 19/20
USPC ............... 198/717, 728, 729, 732; 104/172.1, 104/172.3, 162
See application file for complete search history.

(56) References Cited

U.S. PATENT DOCUMENTS 3,693,392 A * 9/1972 Watson ................. B61B 10/046 104/172.3
3,724,390 A * 4/1973 Beer ....................... B61B 10/04 104/172.3
4,715,287 A 12/1987 Wentworth et al.
4,864,936 A * 9/1989 Rietsch, Jr. ............ B62D 65/18 104/172.1
4,873,929 A 10/1989 Witecki
5,140,910 A * 8/1992 Welter .................... B60S 3/004 104/162
5,432,974 A * 7/1995 Yasutake ................ B60S 3/002 134/123
6,161,483 A * 12/2000 Lipari .................... B62D 65/18 104/172.3
6,186,073 B1 2/2001 Reitsch, Jr.
6,378,693 B1 * 4/2002 Ballestrazzi ......... B65G 19/265 198/728
6,647,894 B1 * 11/2003 Simoes ...................... B61J 3/04 104/172.1
7,243,605 B1 * 7/2007 Belanger ................. B60S 3/004 104/172.1
7,255,220 B2 * 8/2007 Iwai ....................... B65G 35/08 104/172.1
8,028,628 B2 * 10/2011 Ennis ...................... B60S 3/004 104/162
8,985,029 B2 * 3/2015 Turner .................... B60S 3/004 104/162
2002/0066389 A1 * 6/2002 Rietsch, Jr.

OTHER PUBLICATIONS

Belanger, Inc., "DuraTrans XD", http://www.belangerinc.com/pages/duratrans_xd/DuraTransXD_Brochure.pdf, date unknown.

* cited by examiner

*Primary Examiner* — Douglas Hess
(74) *Attorney, Agent, or Firm* — Risso & Associates

(57) ABSTRACT

A conveyor system is described. The conveyor system includes a lower platform for supporting chain driven rollers. Lower rails are also included for supporting the chain driven rollers in a bypass configuration. Upper rails included for supporting the chain driven rollers in a call-up configuration. In operation, a roller take up section receives the chain driven rollers and directs the chain driven rollers toward a roller call-up section. The roller call-up section includes a call-up mechanism that is operable for selectively directing the chain driven rollers from the lower rails to the upper rails when in the call-up configuration.

10 Claims, 29 Drawing Sheets

100
110
900
108
902
11

200

CONVEYOR SYSTEM

CROSS-REFERENCE TO RELATED APPLICATIONS

This is a non-provisional application of U.S. Provisional Application No. 62/076,393, filed on Nov. 6, 2014, entitled, “Over Under Conveyor.”

BACKGROUND OF THE INVENTION (1) Field of Invention

The present invention relates to a conveyor system for vehicle washing systems and, more particularly, to a conveyor system that allows for an operator to easily loosen and tighten a chain drive and that includes improved roller call-up forks.

(2) Description of Related Art

Conveyor systems have long been known in the art of vehicle washing systems. Existing conveyor systems include a chain drive that moves rollers around the conveyor system. The rollers, when positioned next to a vehicle’s tires, push the vehicle through the vehicle washing system. During repeated operation the chain drive can become slack or loose, which can detrimentally impact the effectiveness of the conveyor system and can also potentially damage its components.

Further, conveyor systems include call-up forks that are used to lift the rollers onto an upper rail. Existing call-up forks pivot upwards from a pivot point that is substantially in front of the upper rail. While operable for lifting the rollers onto the upper rail, the configuration can result in damage to the rollers and upper rail when the conveyor system is prevented from operating properly (i.e., due to the presence of a vehicle, a loose chain drive, or any other reason that the roller fails to lift entirely onto the upper rail).

Thus, a continuing need exists for a conveyor system that allows for an operator to easily loosen and tighten a chain drive and that includes improved roller call-up forks.

SUMMARY OF INVENTION

The present invention relates to a conveyor system for vehicle washing systems and, more particularly, to a conveyor system that allows for an operator to easily loosen and tighten a chain drive and that includes improved roller call-up forks.

The conveyor system includes a lower platform for supporting chain driven rollers. Lower rails are also included for supporting the chain driven rollers in a bypass configuration. Upper rails included for supporting the chain driven rollers in a call-up configuration. In operation, a roller take up section receives the chain driven rollers and directs the chain driven rollers toward a roller call-up section. The roller call-up section includes a call-up mechanism that is operable for selectively directing the chain driven rollers from the lower rails to the upper rails when in the call-up configuration.

In some aspects, the roller call-up mechanism includes call-up forks. Additionally, the upper rails include a leading edge and the call-up forks are pivotally connected with the conveyor system at a pivot point that is nearly vertically aligned with the leading edge of the upper rails.

Further, the call-up forks include a ramp having a length and nearly vertical alignment is an alignment such that the pivot point is laterally before the leading edge and at a distance off of vertical alignment that is less than a length of the ramp of the call-up forks.

In some aspects, the distance off of vertical is less than one half the length of the ramp.

In another aspect, the distance off of vertical is less than one sixth the length of the ramp.

In yet another aspect, the conveyor system includes a tensioning section. The tensioning section includes a screw drive connected with the roller take up section to allow an operator to easily loosen and tighten the chain driven rollers as positioned around the roller take up section.

Further, the tensioning section comprises a rotatable bar that projects laterally from the conveyor system for easy access, the rotatable bar being connected with a gear box that is operably connected with the screw drive.

In yet another aspect, a plate is affixed with the conveyor system such that the rotatable bar is slideable along the plate between an operating zone and a maintenance zone, such that when in the operating zone, tension of the chain driven rollers is sufficient such that the conveyor system can be operated, and when the rotatable bar is rotated such that tension is released from the chain driven rollers, the rotatable bar is pulled into the maintenance zone.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a conveyor system for vehicle washing systems and, more particularly, to a conveyor system that allows for an operator to easily loosen and tighten a chain drive and that includes improved roller call-up forks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

Figure 1:
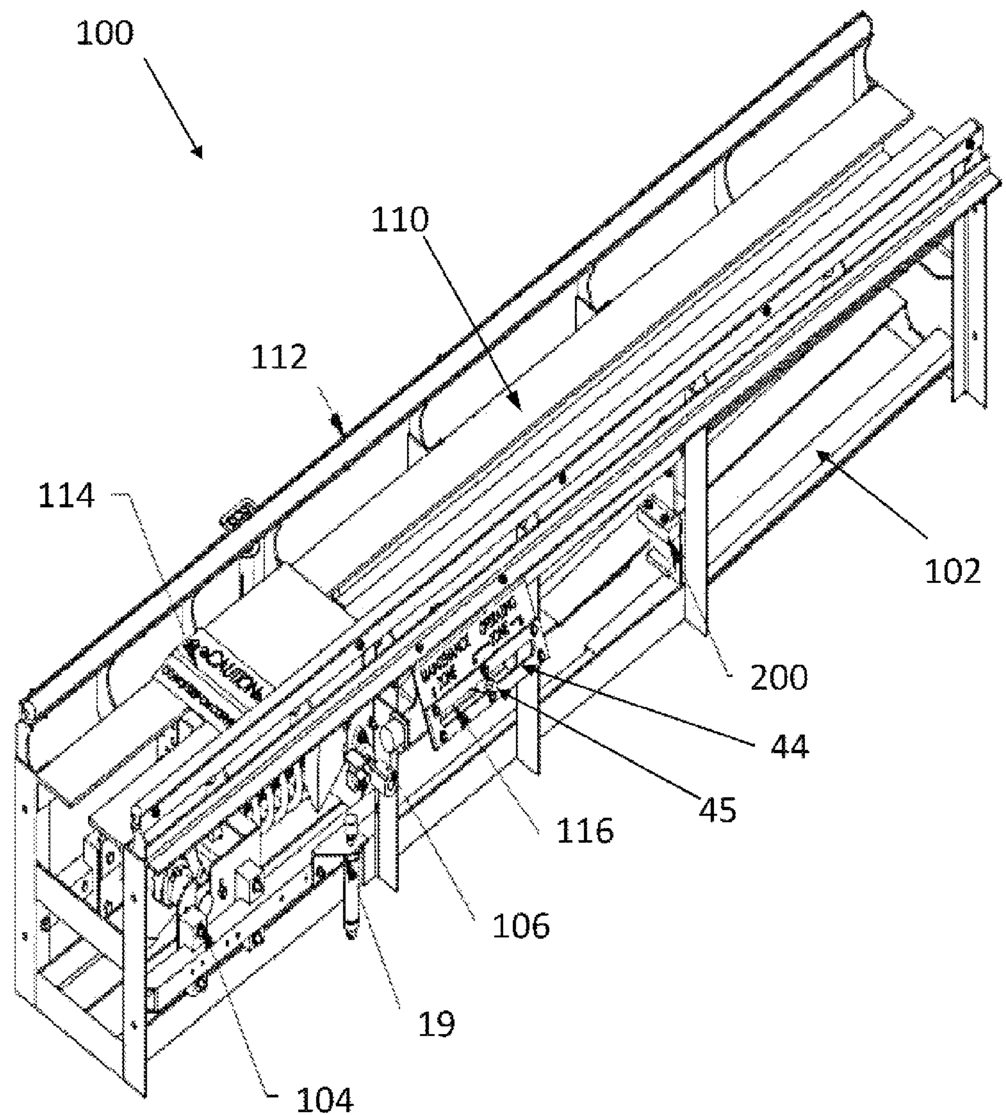
FIG. 1 is a top-perspective view illustration of the conveyor system.

As shown in FIG. 1, described is a conveyor system 100 that allows for an operator to easily loosen and tighten a chain drive and that includes improved roller call-up forks. The figures included herewith illustrate the conveyor system in both call-up and bypass configurations. When the call-up forks are in a call-up configuration, the call-up forks lift chain driven rollers to the upper rail. Alternatively, when the call-up forks are in a bypass configuration, the chain driven roller(s) are allowed to continue to slide along the lower rail. Also depicted is an exploded-view of the various components.

Specifically, FIG. 1 is a top-perspective view illustration of the conveyor system 100. The conveyor system includes a lower platform 102 upon which the rollers slide. The rollers are connected with a chain and are chain driven (via a motor or gear connected with the chain). The rollers continue until they engage with a roller take up section 104. The roller take up section 104 includes a sprocket (as described below) or any other suitable component to direct the rollers toward a roller call-up section 106. The roller call-up section 106 includes a call-up mechanism, such as call-up forks, that are operable for selectively lifting the rollers and chain from lower rails (shown in FIG. 2 as element 108) to upper rails 110. For example, an air cylinder 19 or other actuator can be employed to selectively transition the call-up forks from a bypass position to a call-up configuration.

When in the upper rails 110, the rollers are used to push a vehicle's tires through the conveyor system 100. To maintain the vehicle's tires within the conveyor system 100, a wheel guide 112 is included. The wheel guide 112 is any suitable mechanism or device operable for maintaining the vehicle's tires within the conveyor system 100, a non-limiting example of which includes a rod or round bar. To maintain safety, a pivotally attached roller cover 114 is also included. The roller cover 114 lifts up when the rollers are lifted from the lower rail to the upper rail 110. Alternatively, when the rollers run along the lower rail, the roller cover 114 lays flat to cover the opening through which the rollers rise to the upper rail 110. Also and as noted above, a tensioning section 116 is included to easily loosen and tighten a chain drive. The specifics of these aspects are described in further detail below.

Figure 2:
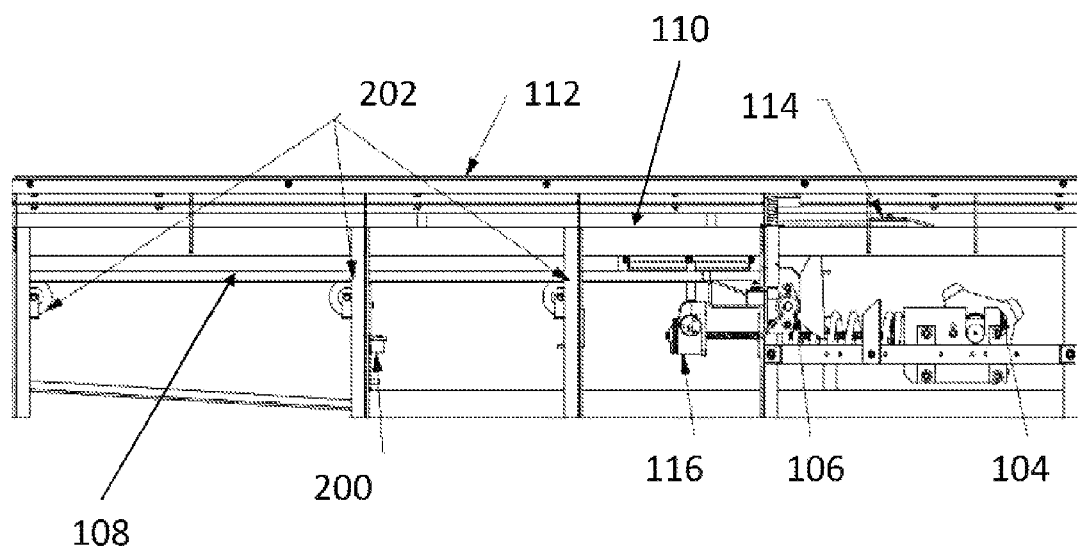
FIG. 2 is a side-view illustration of the conveyor system.

FIG. 2 is a side-view illustration of the conveyor system 100. As shown, the conveyor system includes a roller positioning guide 200 (also depicted in FIG. 1) to maintain alignment and position of the rollers. The rollers continue until they reach the roller take up section 104, at which point the rollers are directed to the roller call-up section 106. The roller call-up section 106 can be selectively activated to lift the rollers from the lower rail 108 to the upper rail 110. In doing so, the rollers lift the roller cover 114 and slide onto the upper rail 110. Since the rollers are chain driven, a series of chain holders 202 can also be included the conveyor system 100. Further and as noted above, to maintain desired tension on the chains of the chain driven rollers, the tension system 116 is included to allow a user to easily tighten and loosen the chain.

Figure 3:
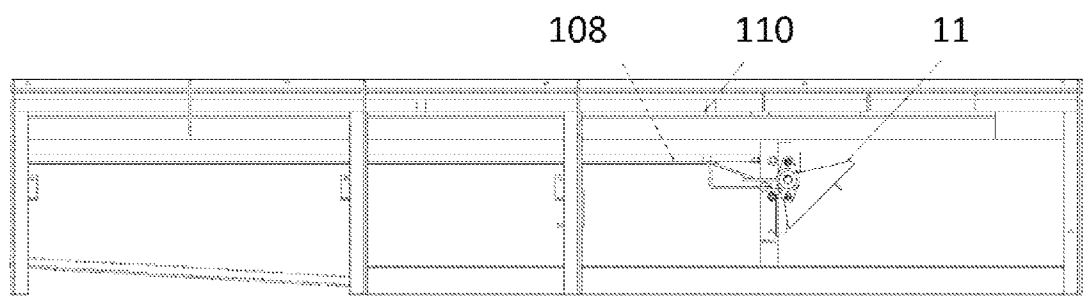
FIG. 3 is a side-view illustration of a call-up mechanism in a bypass configuration.
Figure 4:
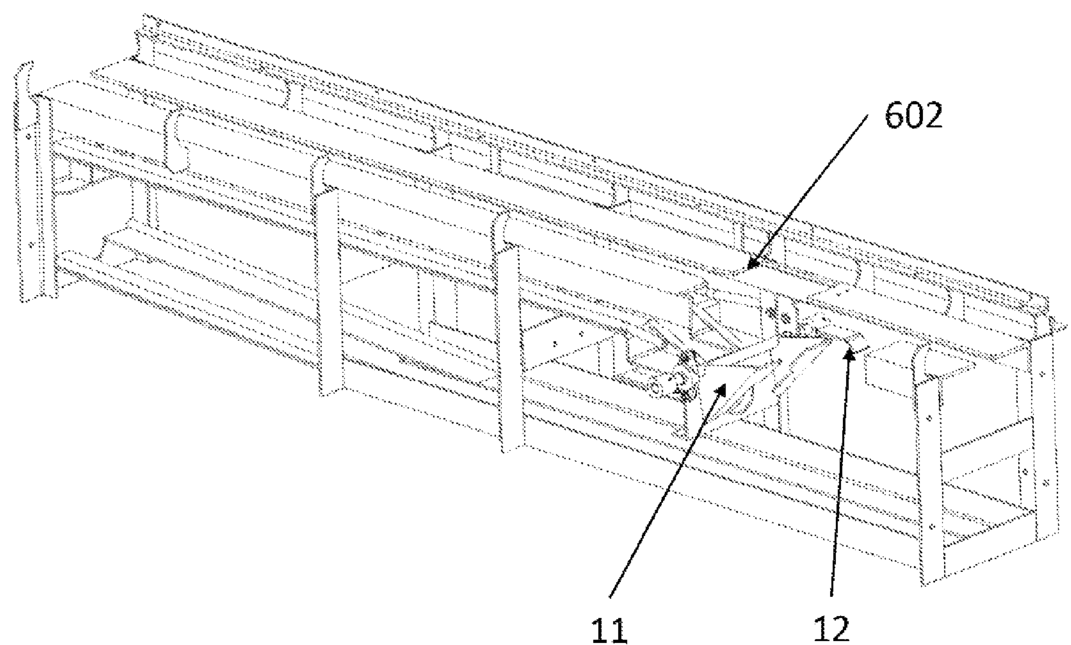
FIG. 4 is a perspective-view illustration of the call-up mechanism in the bypass configuration.

For further understanding. FIG. 3 is a side-view illustration of a call-up mechanism in a bypass configuration. As noted above, the call-up mechanism is any suitable mechanism or device that is operable for selectively lifting the rollers from lower rails 108 to upper rails 110, a non-limiting example of which includes the call-up forks 11. FIG. 4 is a perspective-view illustration of the call-up mechanism in the bypass configuration, showing the call-up forks 11 and an attached fork lift up tab 12. The fork lift up tab 12 is a non-limiting example of a suitable attachment for the call-up forks 11 through which the air cylinder can be used to selectively transition the call-up forks 11 from the bypass configuration to the call-up configuration. For example, the air cylinder is electronically controlled by a control panel. Thus, for example, whenever a the sensor detects a car coming into the channel, a signal is sent to the control panel which then causes the air cylinder to push up, which in turn pushes up the fork lift up tab 12 so that the call-up forks 11 are in the call-up position and the roller can roll up to the upper rails. In this non-limiting example, when the air cylinder is deactivated, the lift up tab 12 falls and, in turn, returns the call-up forks 11 to the bypass configuration.

Figure 5:
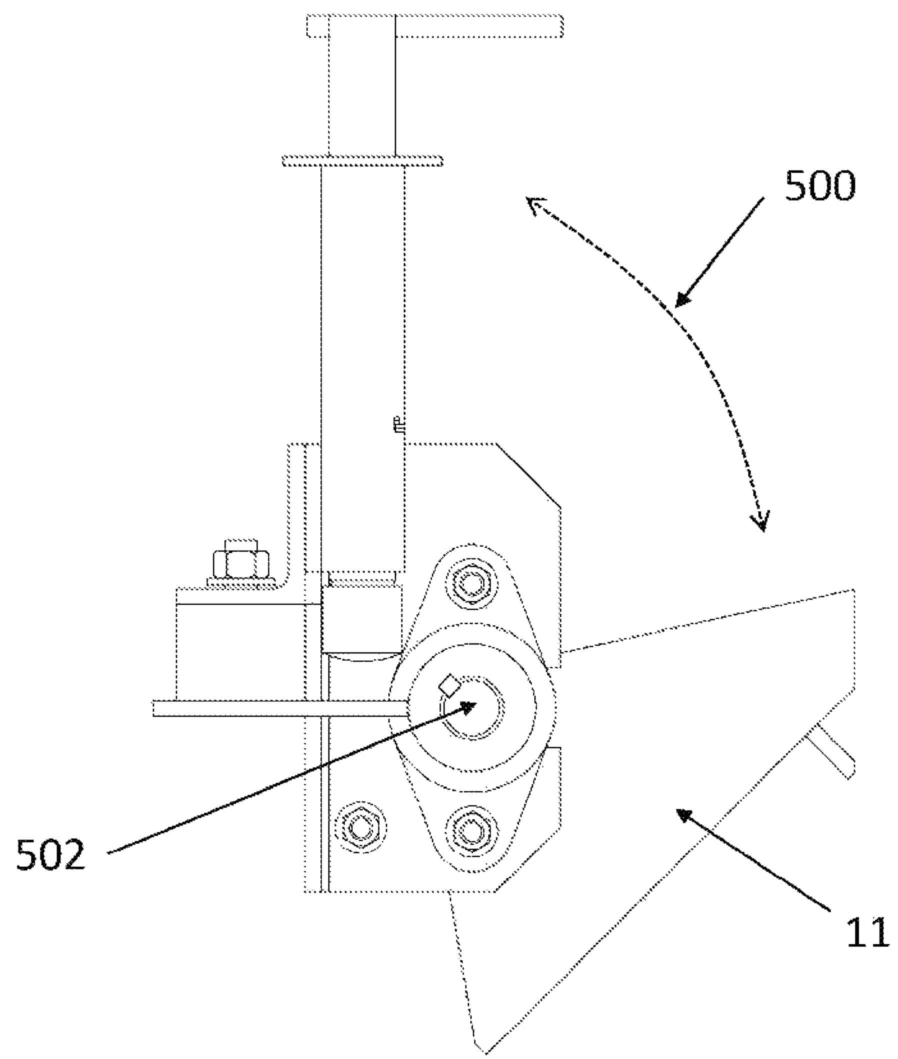
FIG. 5 is a side-view illustration of the call-up mechanism, showing call-up forks in the bypass configuration.

FIG. 5 is a side-view illustration of the call-up mechanism, showing the call-up forks 11 in the bypass configuration. The call-up forks 11 are pivotally attached such that they can be flipped over 500 and into the call-up configuration. As shown, the call-up forks 11 are shaped and positioned (pivotally attached) such that they provide an improved orientation and rotation for calling up the rollers and reduce the likelihood of damaging the rollers. Existing call-up forks pivot upwards from a pivot point that is substantially in front of the upper rail. Alternatively and as shown in FIG. 5, the call-up forks 11 according to some aspects of the present invention rotate over 500 and into the call-up configuration from a pivot point 502 that is nearly vertically aligned with the leading edge of the upper rails.

Figure 6:
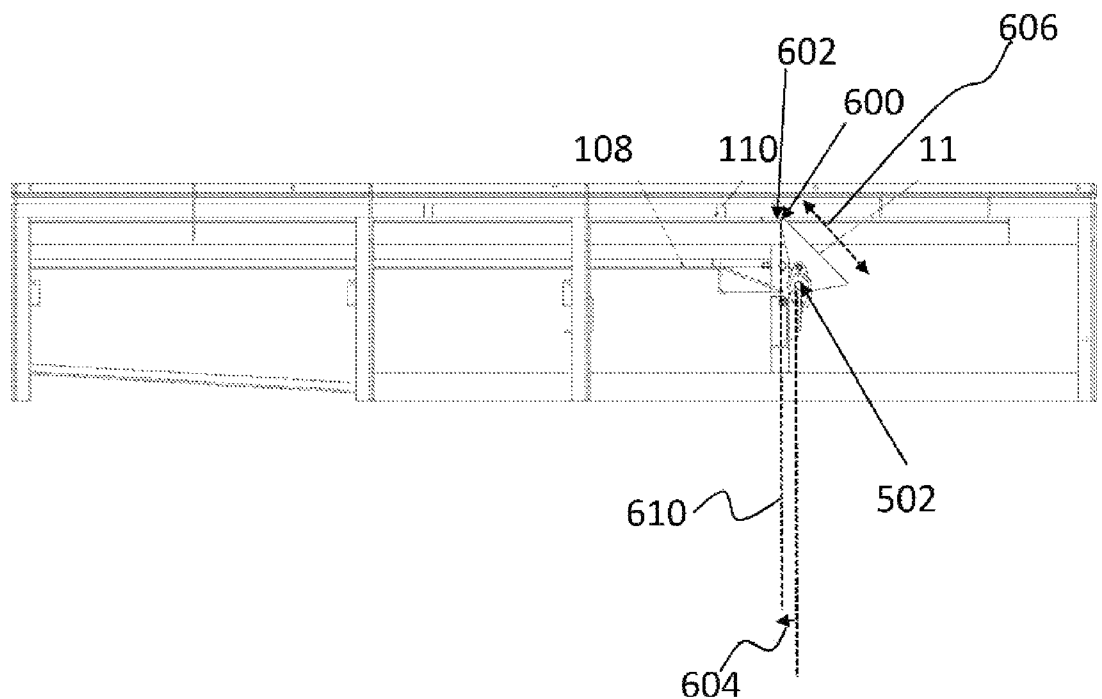
FIG. 6 is a side-view illustration of the call-up mechanism in a call-up configuration.

For example and as shown FIG. 6, the call-up forks 11 can be pivoted into the call-up configuration to lift the rollers from the lower rails 108 to the upper rails 110. As shown, the call-up forks 11 rotate from the pivot point 502 which is nearly vertically aligned with a leading edge 600 of the upper rails 110. In some aspects, when the call-up forks 11 are in the call-up configuration, a fork edge 600 of the call-up forks 11 rests against the leading edge 602 (also depicted in FIG. 4) of the upper rails 110. In doing so, the call-up forks 11 are securely affixed and pressed against the upper rails 110 when the rollers are sliding up the call-up forks 11 and onto the upper rails 110. This is a significant improvement over the prior art in which the call-up forks rotate up from a pivot point substantially in front of the leading edge 602 of the upper rails 110 (which can result in damage to the rollers if the call-up fork is not functioning properly).

Alternatively and as noted above, the pivot point 502 is nearly vertically aligned with the leading edge of the upper rails 110. In some aspects, the pivot point 502 can be in vertical 610 alignment with the leading edge of the upper rails 110. In other aspects, the pivot point 502 can be beyond the leading edge of the upper rails 110. Further, in some other aspects, the alignment is nearly vertical 610 from a point before the leading edge. Nearly vertical 610 alignment is any alignment such that the distance 604 off of vertical 610 alignment is less than a length 606 of the ramp of the call-up fork 11. Desirably, the distance 604 off of vertical 610 is less than one half the length 606 and, more desirably, less than one quarter of the length 606. As a non-limiting example, the distance 604 off of vertical 610 alignment is approximately one sixth the length 606.

Figure 7:
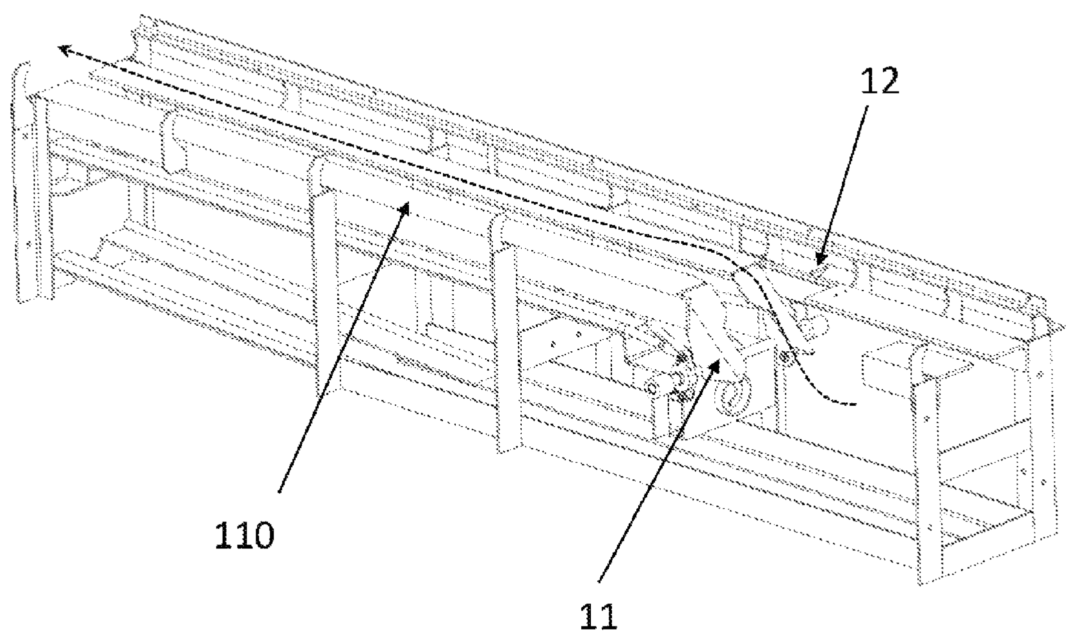
FIG. 7 is a perspective-view illustration of the call-up mechanism in the call-up configuration.
Figure 8:
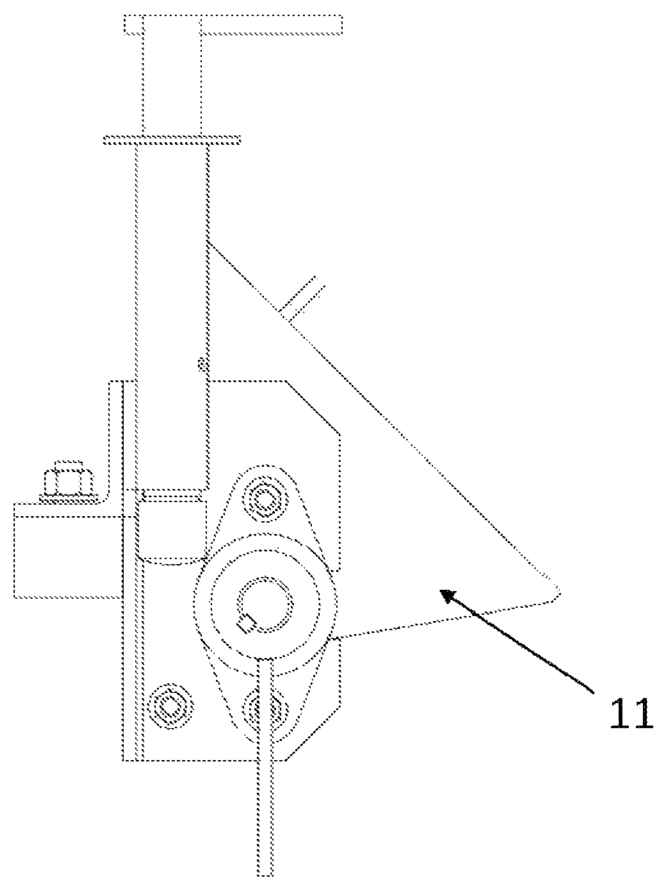
FIG. 8 is a side-view illustration of the call-up mechanism, showing the call-up forks in the call-up configuration.

For further understanding, FIG. 7 is a perspective-view illustration of the call-up mechanism in the call-up configuration, showing the call-up forks 11 and an attached fork lift up tab 12. Notably, when the call-up forks 11 are in the call-up configuration, it is shown how the rollers would easily lift onto the upper rails 110. FIG. 8 is a side-view illustration of the call-up mechanism, showing the call-up forks 11 in the call-up configuration.

Figure 9A:
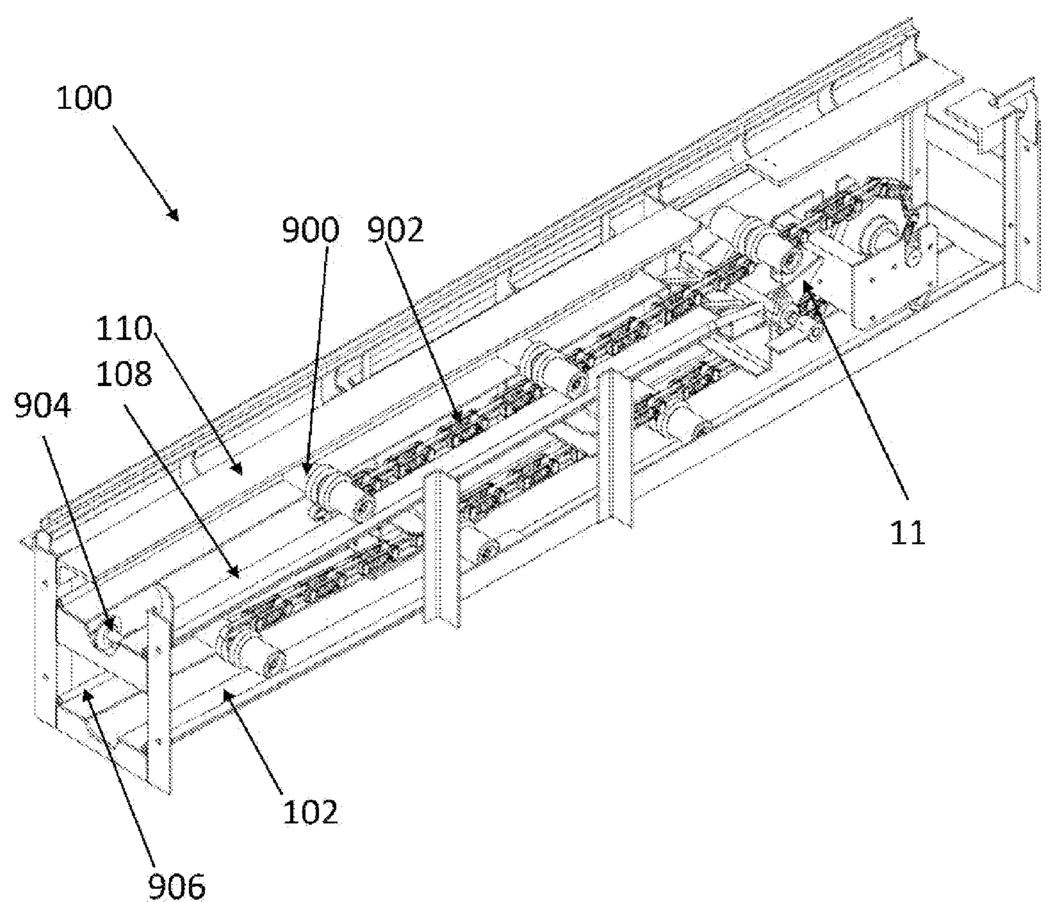
FIG. 9A is an interior-view illustration of the conveyor system, showing the call-up mechanism in the bypass configuration.
Figure 9B:
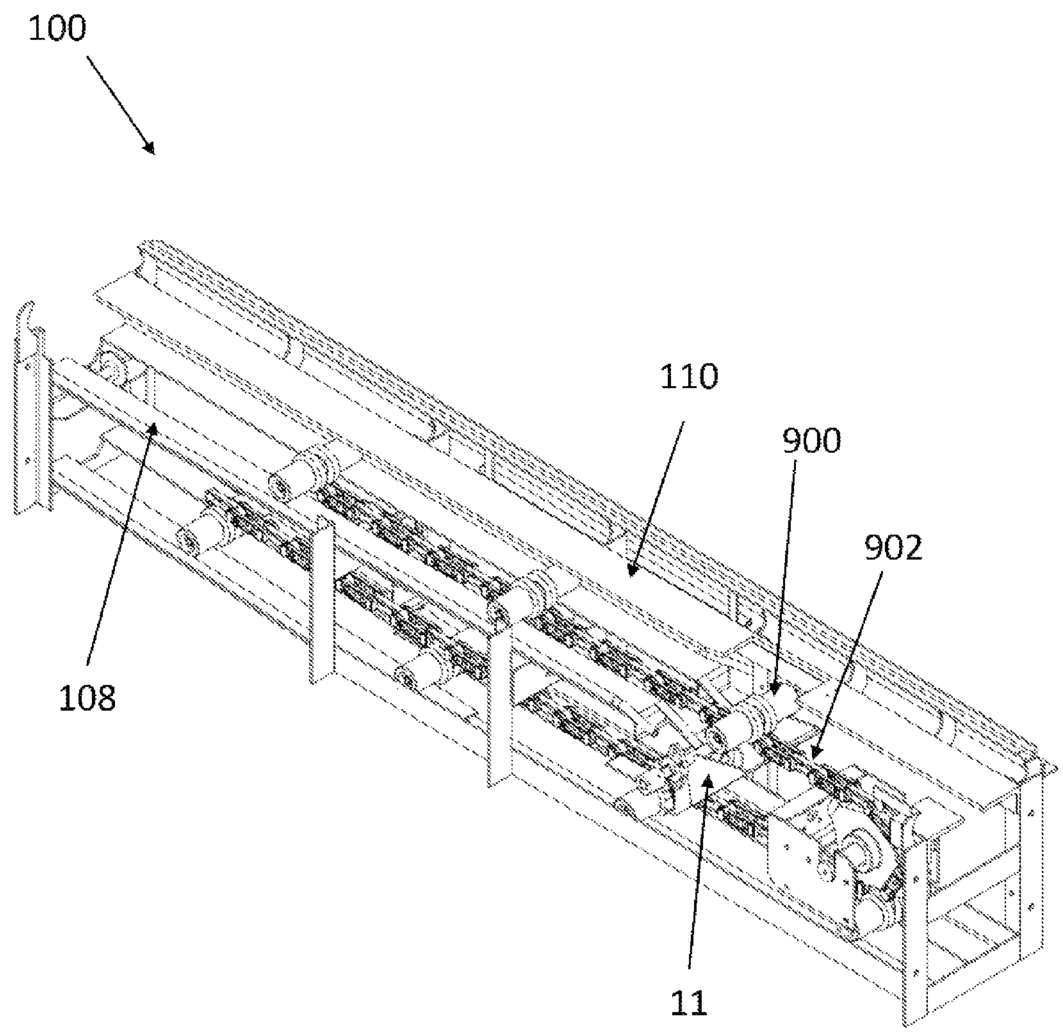
FIG. 9B is an interior-view illustration of the conveyor system, showing the call-up mechanism in the bypass configuration.
Figure 9C:
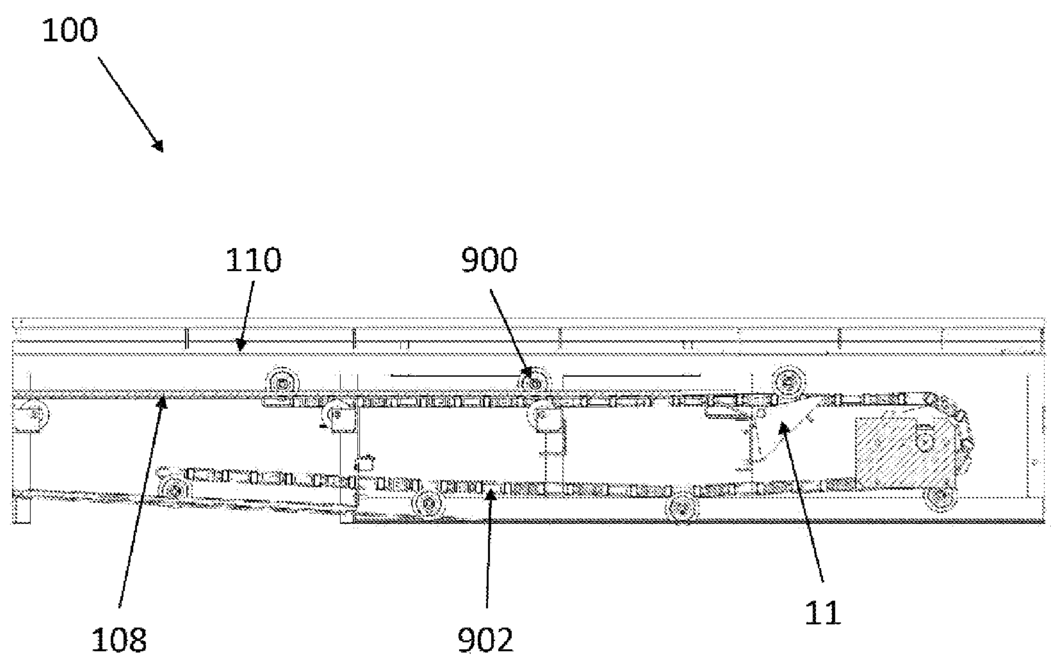
FIG. 9C is a cross-sectional, side-view illustration of the conveyor system, showing the call-up mechanism in the bypass configuration.
Figure 10A:
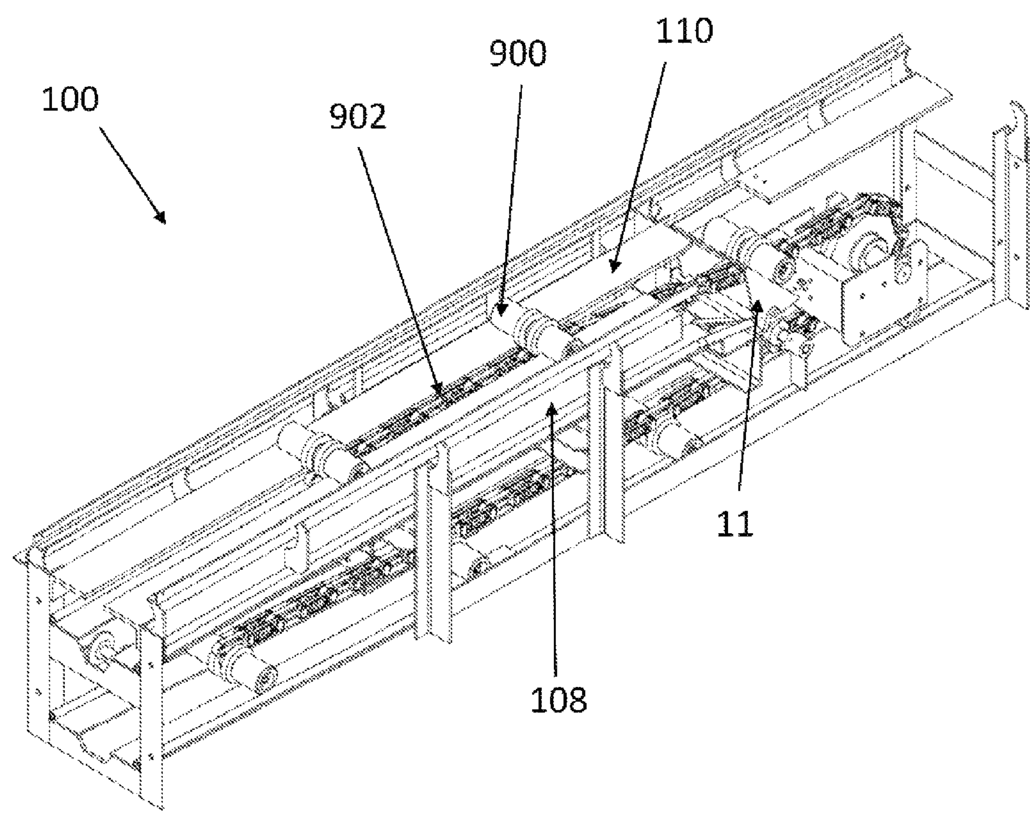
FIG. 10A is an interior-view illustration of the conveyor system, showing the call-up mechanism in the call-up configuration.
Figure 10B:
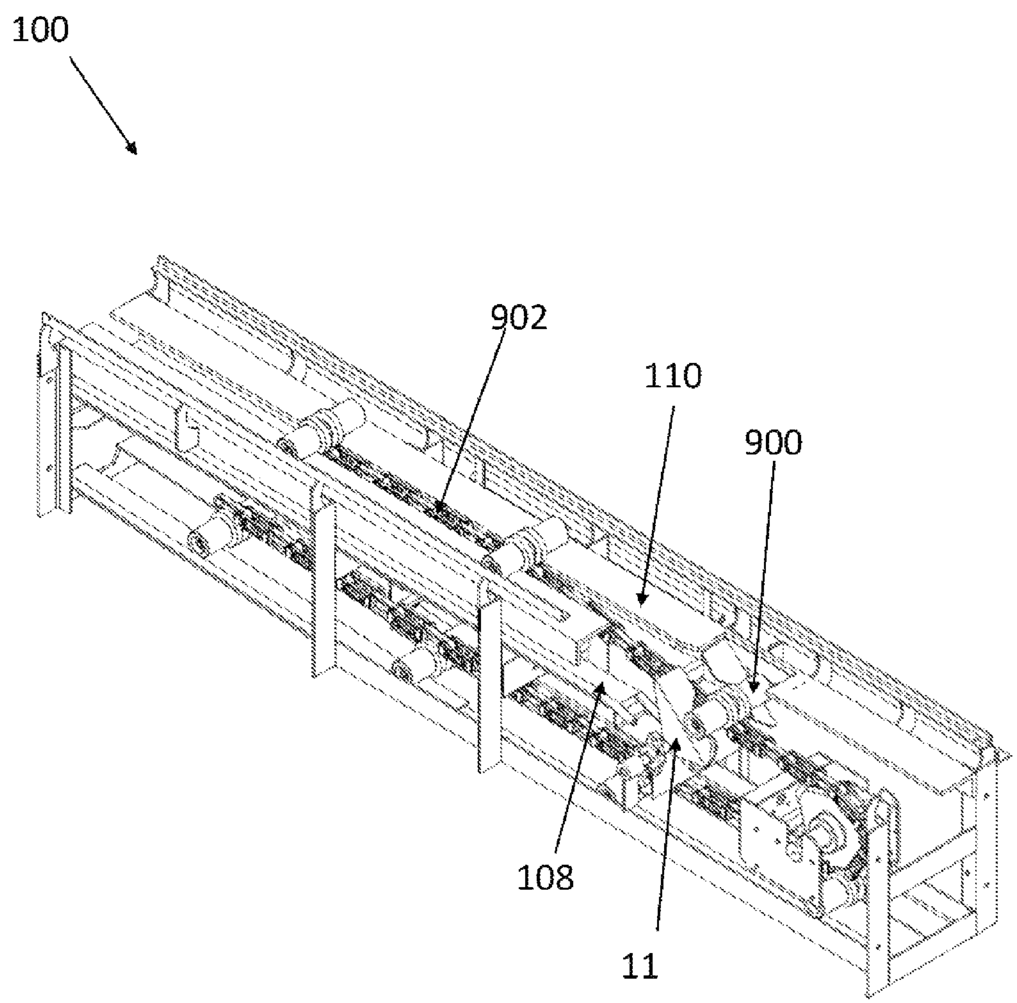
FIG. 10B is an interior-view illustration of the conveyor system, showing the call-up mechanism in the call-up configuration.
Figure 10C:
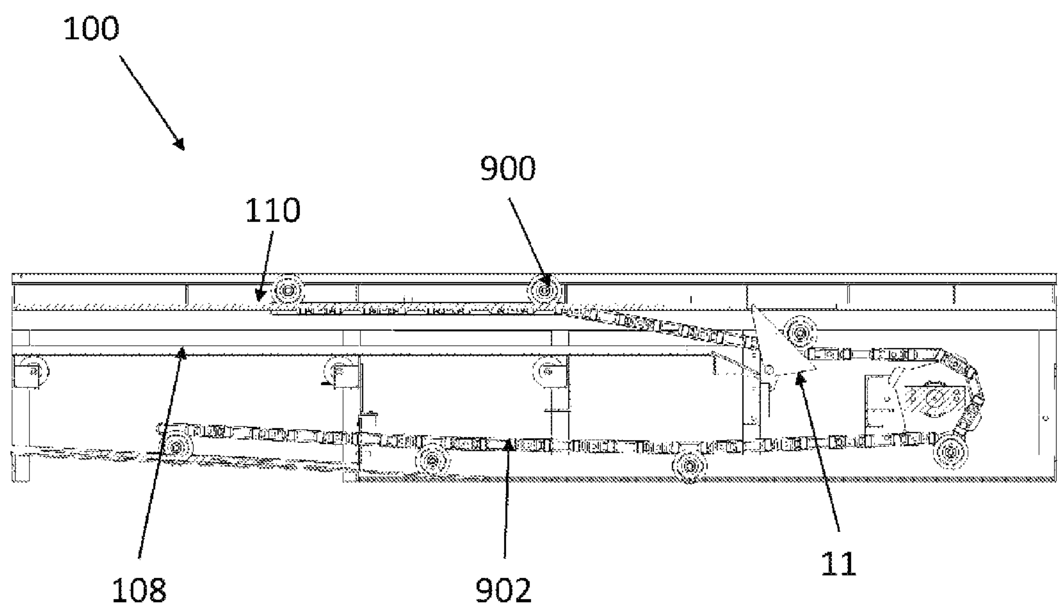
FIG. 10C is a cross-sectional, side-view illustration of the conveyor system, showing the call-up mechanism in the call-up configuration.
Figure 11:
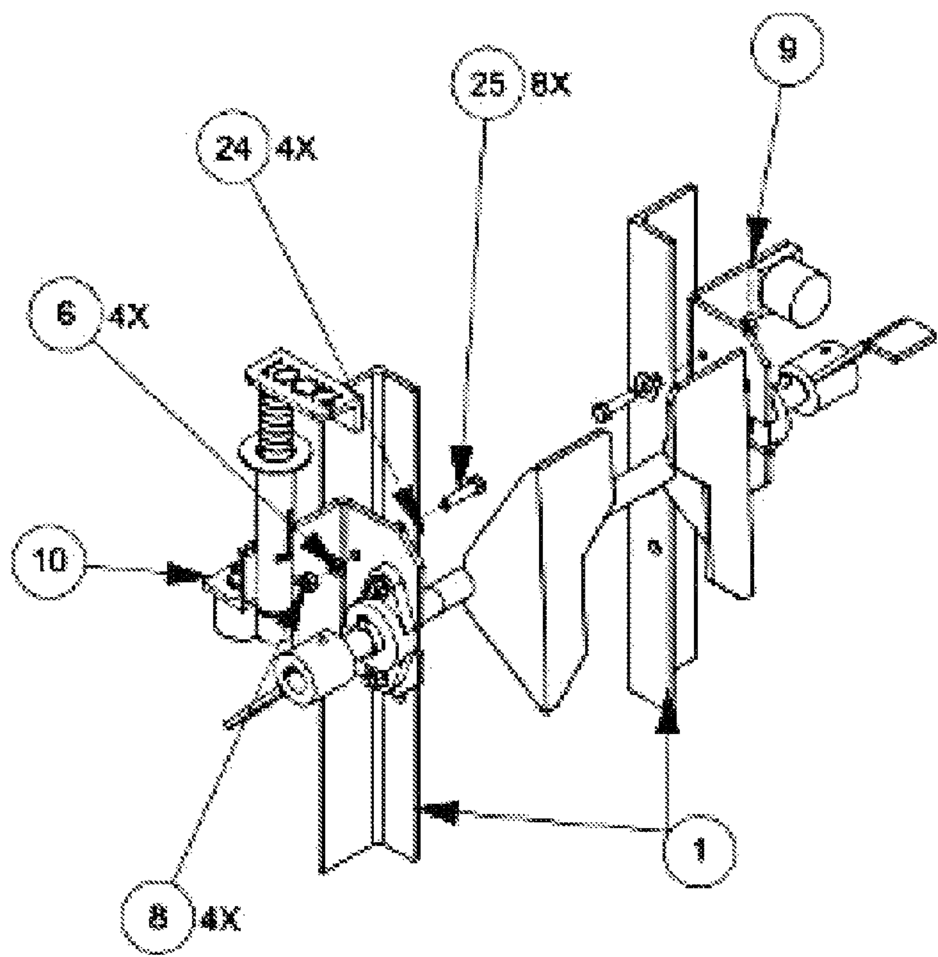
FIG. 11 is an exploded-view illustration of the call-up section.
Figure 12:
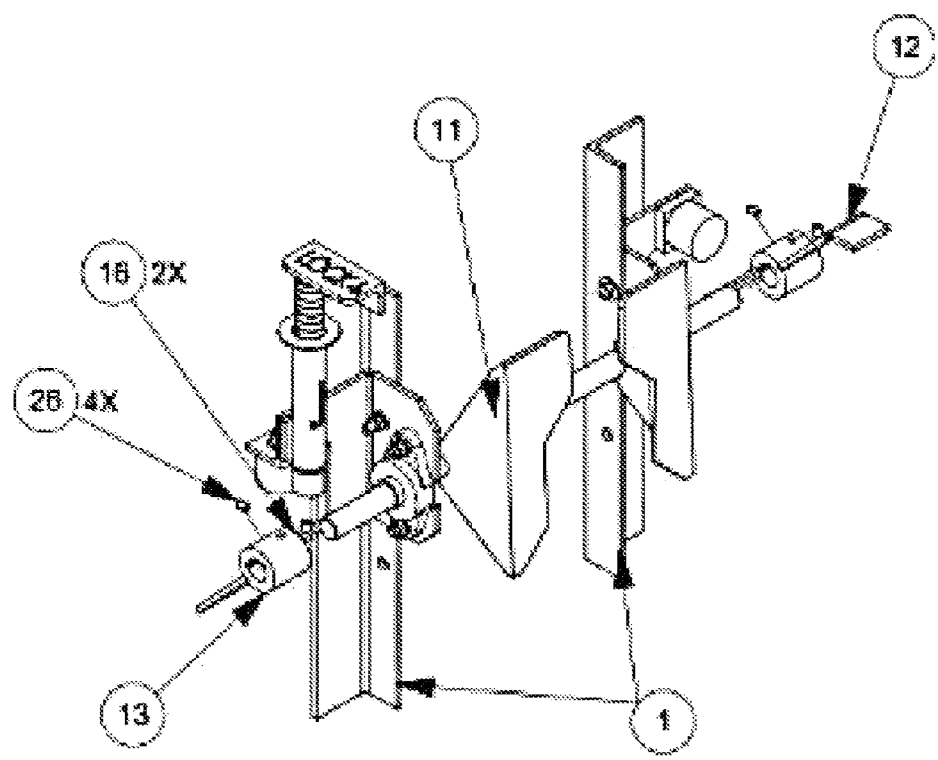
FIG. 12 is an exploded-view illustration of the call-up section.
Figure 13:
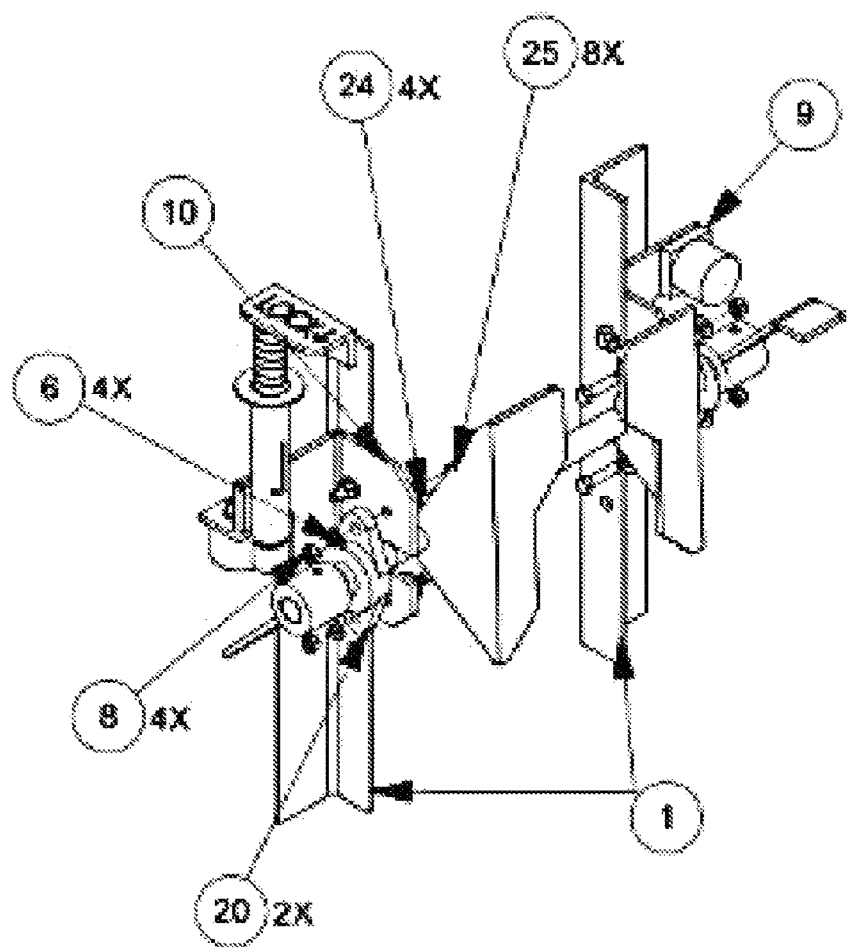
FIG. 13 is an exploded-view illustration of the call-up section.
Figure 14:
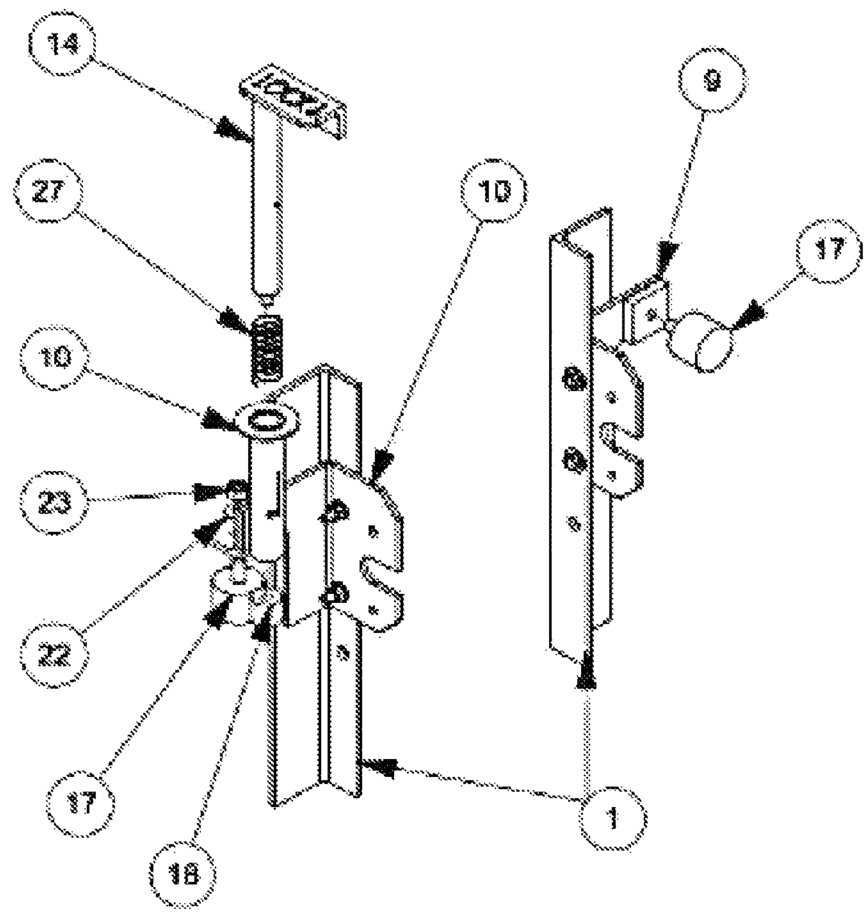
FIG. 14 is an exploded-view illustration of the call-up section.

For further understanding, FIGS. 9A through 10C show the conveyor system 100 with the call-up mechanism in the bypass configuration and call-up configurations, respectively. Notably, the rollers 900 are included to further illustrate how the rollers 900 are carried by the chain 902 and engage with the conveyor system 100 and transition from the lower rails 108 to the upper rails 110. As shown in FIGS. 9A through 9C, when in the bypass configuration, the call-up forks 11 allow the rollers to continue past the call-up forks 11 and along the lower rails. Alternatively and as shown in FIGS. 10A through 10C, when in the call-up configuration, the call-up forks 11 act as ramps to lift the rollers 900 (as pulled by the chain 902) up and onto the upper rails 110.

It should be noted that FIG. 9A also depicts center roller holders 904 that are used to hold the rollers 900 and allow the chain 902 to easily glide along the lower rail 108. Further, as the rollers 900 are pulled along the lower platform 102, side roller holders 906 straddle the lower platform 102 to maintain the rollers 900 within and upon the lower platform 102.

Figure 21:
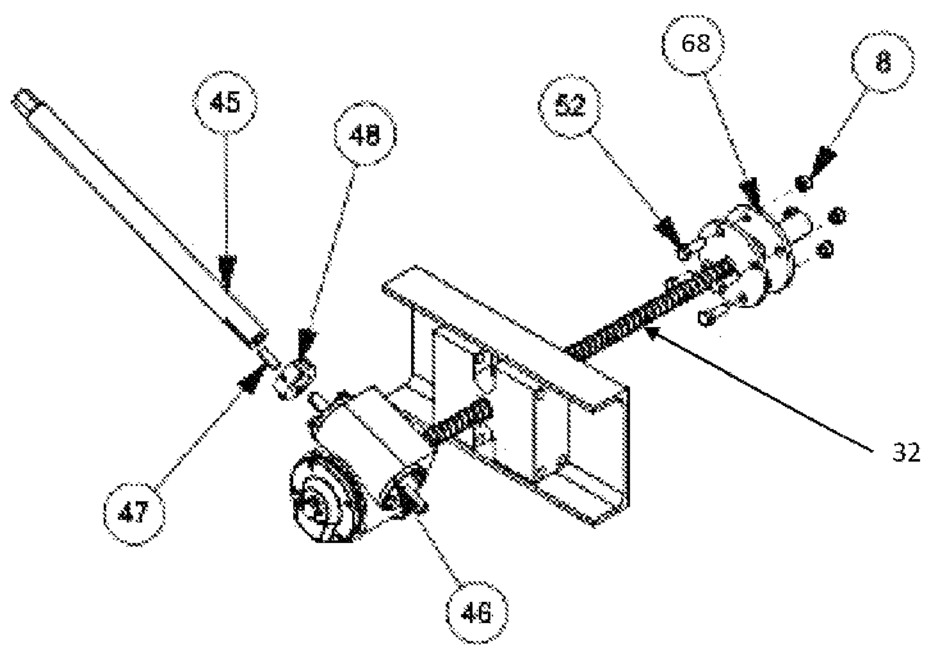
FIG. 21 is an exploded-view illustration of the tensioning section.

As noted above, the invention also includes a tensioning section to allow an operator to easily loosen and tighten a chain drive. In doing so, the conveyor system includes a screw drive to easily loosen and tighten the chain drive. This aspect is illustrated as the tensioning section, which as shown in FIG. 21, includes an easily accessible bar 45 that can be rotated to actuate a gear box (screw jack 46) and rotate the screw drive 32, thereby selectively moving (element 1500 in FIG. 15) the roller take-up (e.g., element 33 in FIG. 15) in and out. In doing so, the operator can selectively loosen and tighten the chain drive or belt (which is wrapped around the roller take-up). Referring again to FIG. 1, the bar 45 can be seen as being accessible at the side of the conveyor system 100. The bar 45 is slideable between two zones of the depicted plate 44 (i.e., an “operating zone” and a “maintenance zone”). When in the “operating zone,” the tension of the chain is sufficient such that the conveyor system 100 can be safely operated. However, when the bar 45 is rotated such that tension is released from the chain, the bar 45 is pulled into the “maintenance zone,” indicating that the conveyor system 100 should not be operated since tension on the chain is released.

Figure 15:
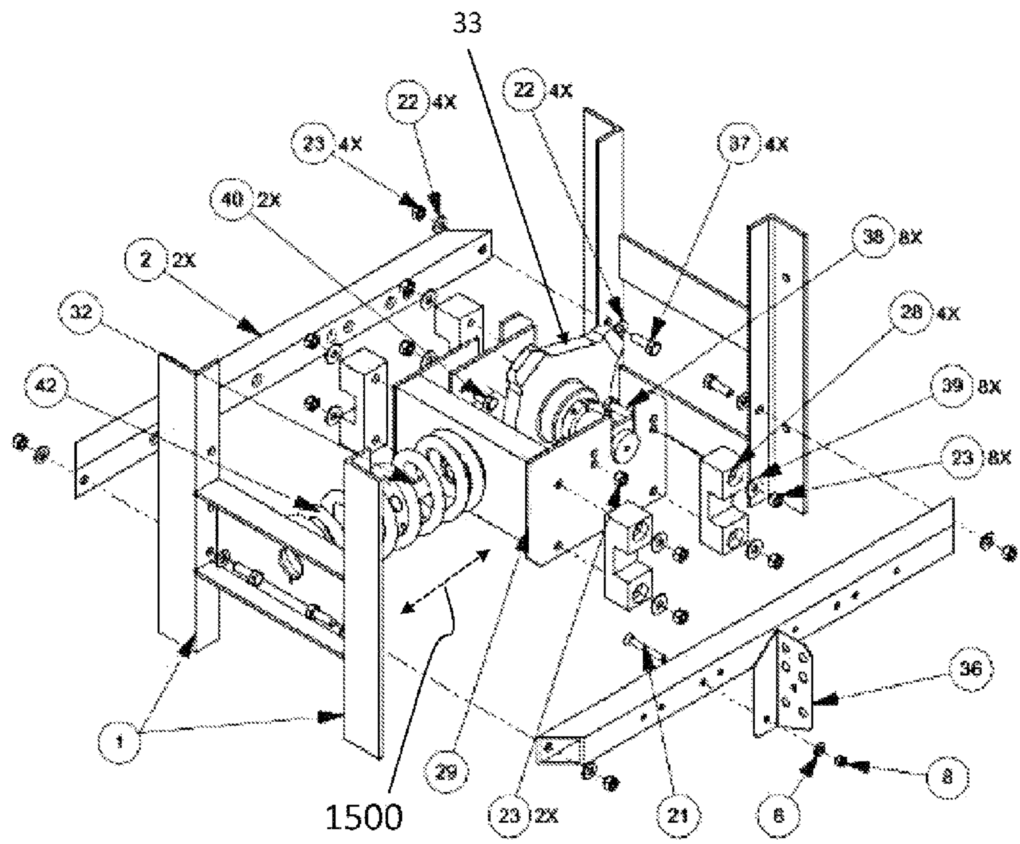
FIG. 15 is an exploded-view illustration of the take-up section.
Figure 16:
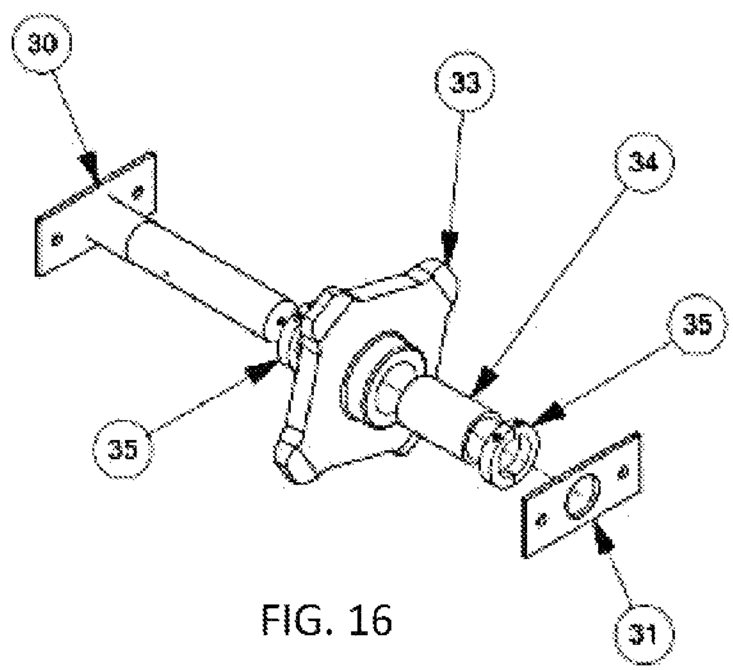
FIG. 16 is an exploded-view illustration of the take-up section.
Figure 17:
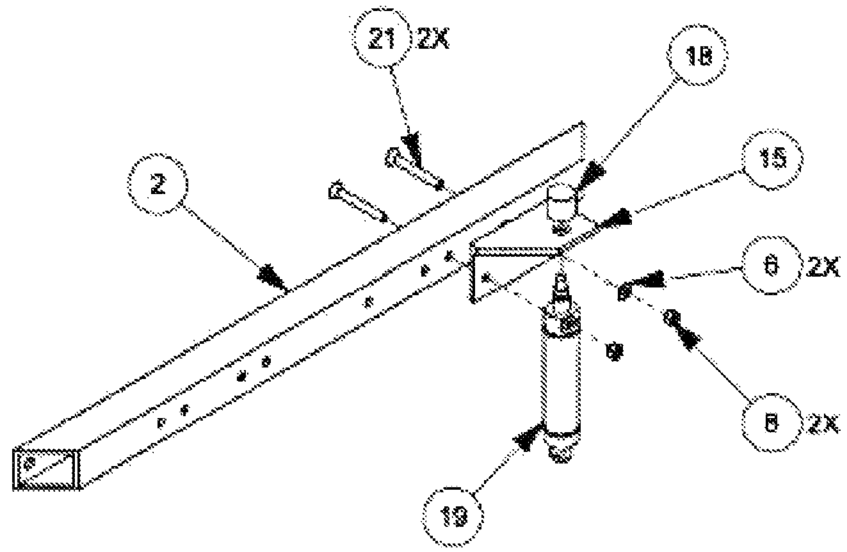
FIG. 17 is an exploded-view illustration of the take-up section.
Figure 18:
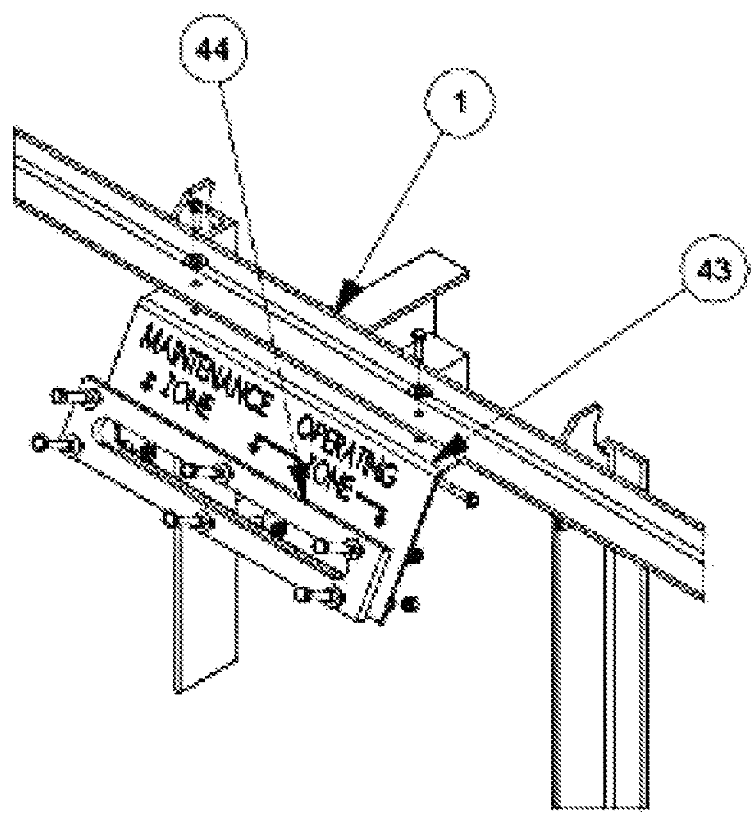
FIG. 18 is an exploded-view illustration of the tensioning section.
Figure 19:
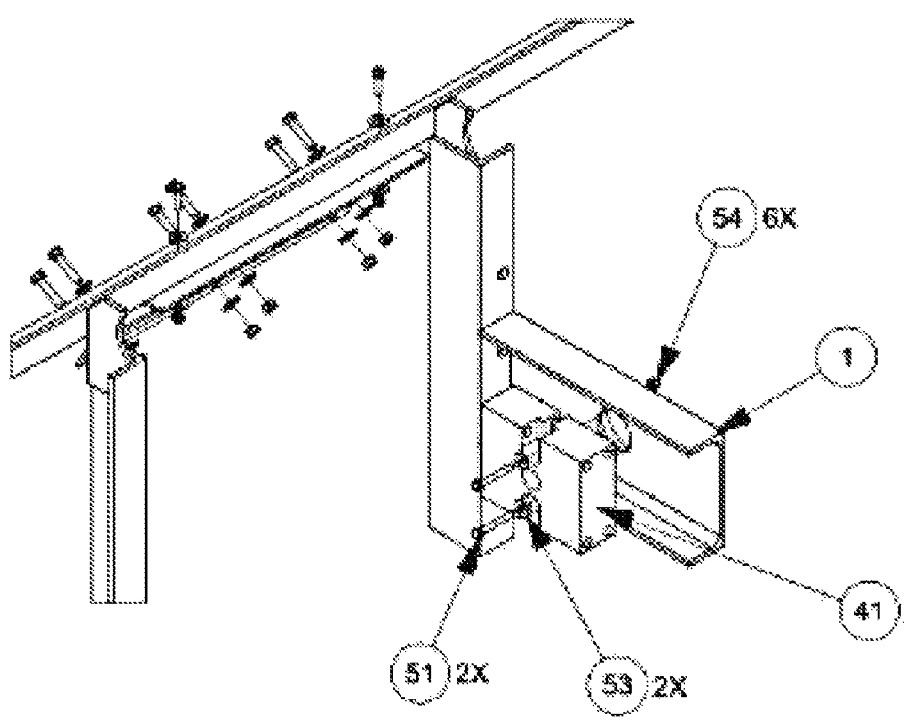
FIG. 19 is an exploded-view illustration of the tensioning section.
Figure 20:
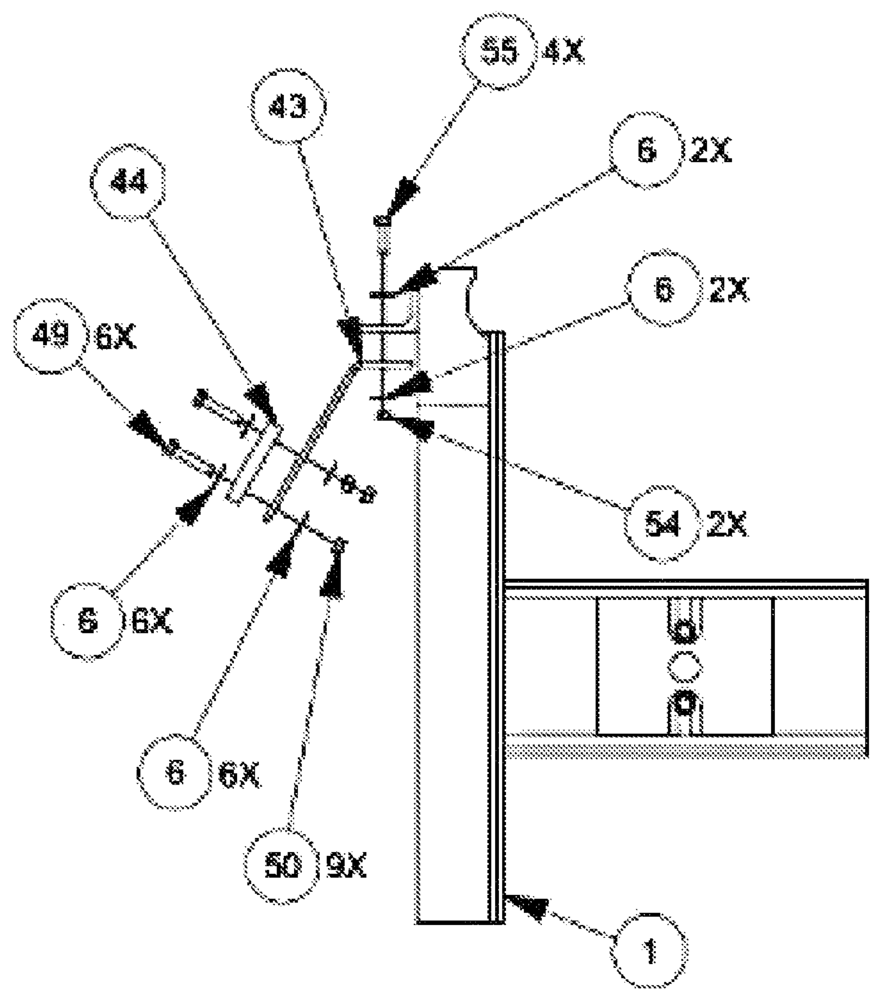
FIG. 20 is an exploded-view illustration of the tensioning section.
Figure 22:
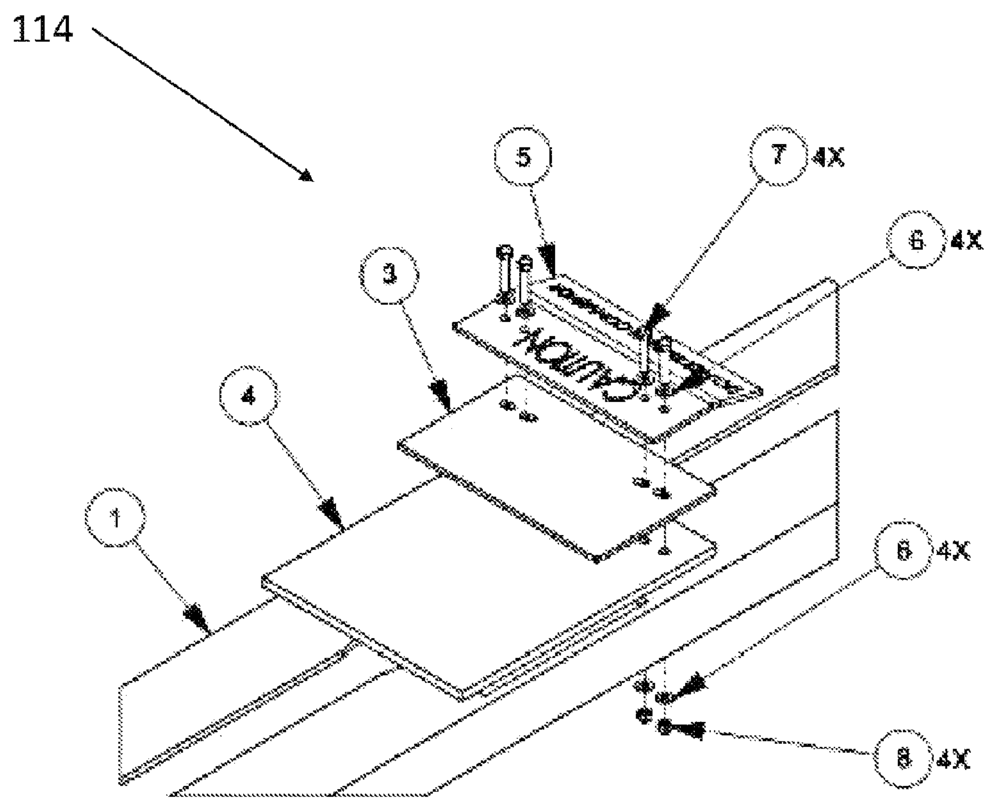
FIG. 22 is an exploded-view illustration of the roller cover.
Figure 23:
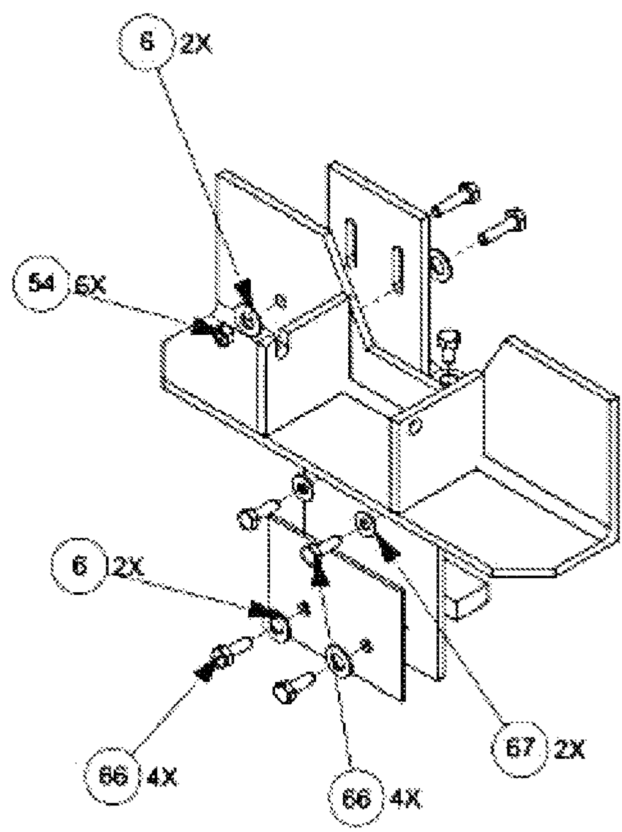
FIG. 23 is an exploded-view illustration of a roller positioning guide.
Figure 24:
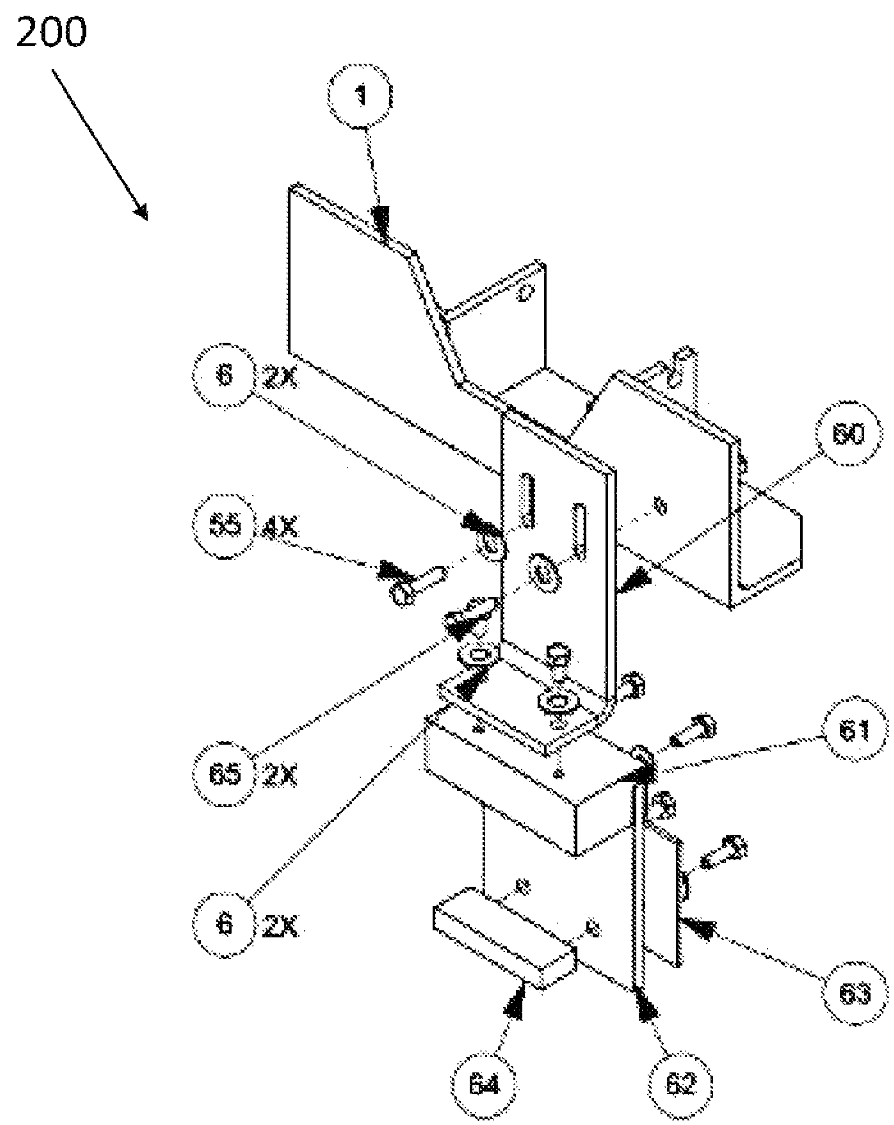
FIG. 24 is an exploded-view illustration of the roller positioning guide.

For further understanding of various components of the conveyor system, FIGS. 11 through 14 provide exploded-view illustrations of the call-up section. FIGS. 15 through 17 provide various exploded-view illustrations of the take-up section. FIGS. 18 through 21 provide various exploded-view illustrations of the tensioning section. FIG. 22 provides an exploded-view illustrations of the roller cover 114. FIGS. 23 and 24 provide an exploded-view illustrations of the roller positioning guide 200 which provides alignment and maintains the correct position of the rollers as they roll through the conveyor system. More specifically and in some aspects, the roller-positioning guide includes a counter switch. This switch is used as an added safety feature, which helps prevent roller jams, and as a counter for the number of rollers sent to the upper rail. The switch works as a delay for the roller call-up system so that when the car wash controller sends a signal to raise the roller call-up forks, it will only do so if and when a roller triggers the switch making the forks rise approximately one and a half feet before the roller to be called up.

Figure 25:
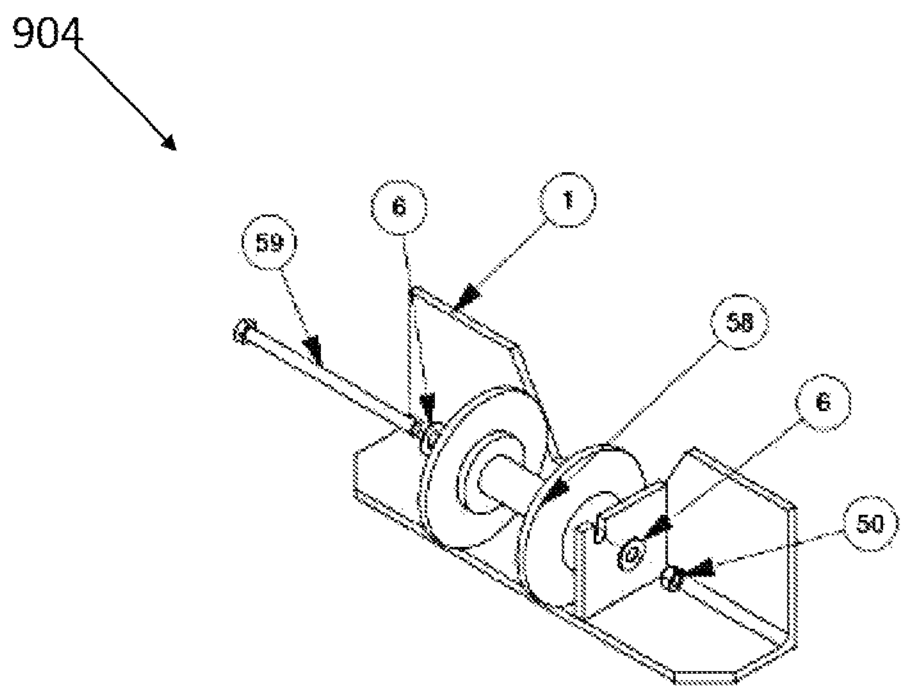
FIG. 25 is an exploded-view illustration of a chain guide roller.
Figure 26:
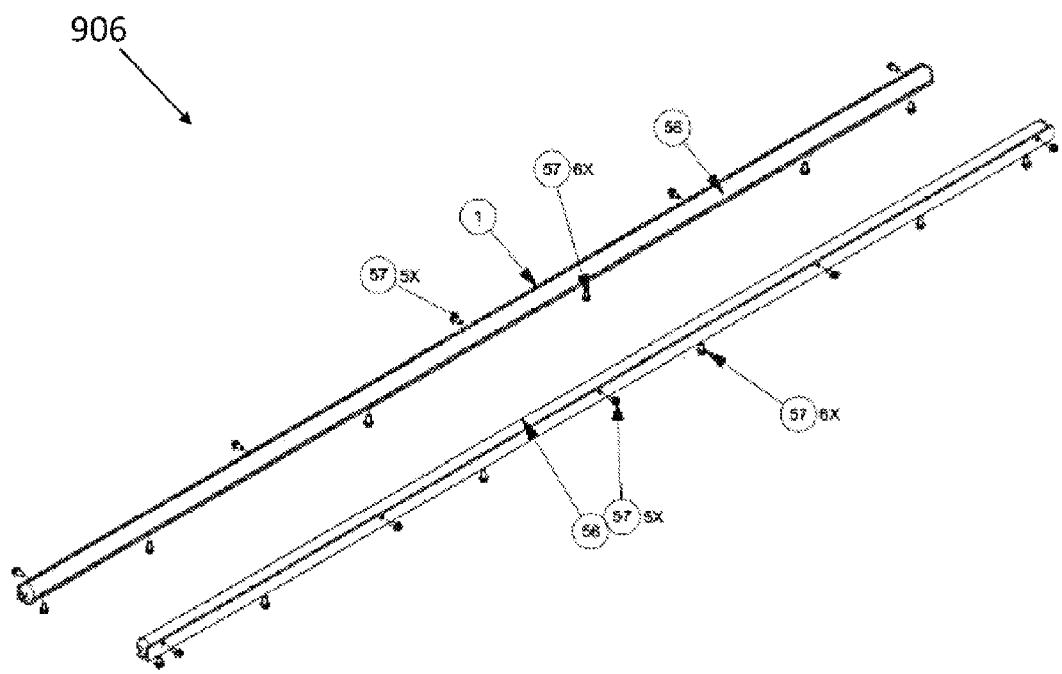
FIG. 26 is an exploded-view illustration of a side roller holder.

FIG. 25 provides an exploded-view illustration of a chain guide roller 904, which is affixed with the lower rails to assist in guiding the chain and rollers when on the lower rails. The chain guide roller 904 maintains the chain tracking straight down the center of the conveyor track, in some aspects, the chain guide roller 904 includes three pieces, two side containment rollers and one center chain support roller. The three-piece design eliminates binding and excessive wear on the support bolt.

Finally, 26 provides exploded-view illustration of a pair of side roller holders 906, which assists in maintaining the rollers on the lower platform by holding the rollers between each of the side roller holders 906.

A key to the numerals as depicted in FIGS. 13 through 26 is as follows:

| Item Number: | Description: |
|---|---|
| 1 | Frame Member |
| 2 | Frame member |
| 3 | Plate |
| 4 | Plate |
| 5 | Cover Plate |
| 6 | Washer |
| 7 | Cap Screw |
| 8 | Hex Nut |
| 9 | Bracket |
| 10 | Bracket |
| 11 | Call-up Forks |
| 12 | Fork Lift Up Tab |
| 13 | Sleeve |
| 14 | Lock Bar |
| 15 | Bracket |
| 16 | Lock Pin |
| 17 | Bumper |
| 18 | Bumper |
| 19 | Air Cylinder |
| 20 | Collar |
| 21 | Socket Countersunk Cap Screw |
| 22 | Flat Washer |
| 23 | Hex Nut |
| 24 | Fender Washer |
| 25 | Cap Screw |
| 26 | Socket Head Cap Screw |
| 27 | Spring |
| 28 | Bar |
| 29 | Bracket |
| 30 | Bracket |
| 31 | Bracket |
| 32 | Screw Drive |
| 33 | Sprocket |
| 34 | Spacer |
| 35 | Split Lock |
| 36 | Bracket |
| 37 | Cap Screw |
| 38 | Cap Screw |
| 39 | Fender Washer |
| 40 | Cap Screw |
| 41 | Flat Bar |
| 42 | Tension Coil |
| 43 | Plate |
| 44 | Plate |
| 45 | Bar |
| 46 | Screw Jack |
| 47 | Keystock |
| 48 | Split Lock |
| 49 | Cap Screw |
| 50 | Hex Nut |
| 51 | Cap Screw |
| 52 | Cap Screw |
| 53 | Flat Washer |
| 54 | Hex Nut |
| 55 | Cap Screw |
| 56 | Round Bar |
| 57 | Hex Washer Screw |
| 58 | Chain Holder |
| 59 | Cap Screw |
| 60 | Adjustable Bracket |
| 61 | Bar |
| 62 | Bracket |
| 63 | Plate |
| 64 | Bar |
| 65 | Cap Screw |
| 66 | Cap Screw |
| 67 | Flat Washer |
| 68 | Collar |

It should be understood that although the key above provides examples of suitable components that can be used to build the various sections and features of the present invention, the invention is not intended to be limited thereto as any suitable components can be incorporated into the conveyor system to provide the functions and features as described herein.

What is claimed is:

1. A conveyor system, comprising:

a lower platform for supporting chain driven rollers;

lower rails for supporting the chain driven rollers in a bypass configuration;

upper rails for supporting the chain driven rollers in a call-up configuration;

a roller take up section formed to receive the chain driven rollers and direct the chain driven rollers toward a roller call-up section;

a roller call-up section, the roller call-up section including a call-up mechanism operable for selectively directing the chain driven rollers from the lower rails to the upper rails;

wherein the roller call-up mechanism includes call-up forks; and wherein the upper rails include a leading edge and wherein the call-up forks are pivotally connected with the conveyor system at a pivot point that is nearly vertically aligned with the leading edge of the upper rails.

2. The conveyor system as set forth in claim 1, wherein the call-up forks include a ramp having a length, and wherein nearly vertical alignment is an alignment such that the pivot point is laterally before the leading edge and at a distance off of a vertical alignment that is less than a length of the ramp of the call-up forks.

3. The conveyor system as set forth in claim 2, wherein the distance off of vertical is less than one half the length of the ramp.

4. The conveyor system as set forth in claim 3, wherein the distance off of vertical is less than one sixth the length of the ramp.

5. The conveyor system as set forth in claim 4, further comprising a tensioning section, the tensioning section having a screw drive connected with the roller take up section to allow an operator to easily loosen and tighten the chain driven rollers as positioned around the roller take up section.

6. The conveyor system as set forth in claim 5, wherein the tensioning section further comprises a rotatable bar that projects laterally from the conveyor system for easy access, the rotatable bar being connected with a gear box that is operably connected with the screw drive.

7. The conveyor system as set forth in claim 6, further comprising a plate affixed with the conveyor system such that the rotatable bar is slideable along the plate between an operating zone and a maintenance zone, such that when in the operating zone, tension of the chain driven rollers is sufficient such that the conveyor system can be operated, and when the rotatable bar is rotated such that tension is released from the chain driven rollers, the rotatable bar is pulled into the maintenance zone.

8. A conveyor system, comprising:

a lower platform for supporting chain driven rollers;

lower rails for supporting the chain driven rollers in a bypass configuration;

upper rails for supporting the chain driven rollers in a call-up configuration;

a roller take up section formed to receive the chain driven rollers and direct the chain driven rollers toward a roller call-up section;

a roller call-up section, the roller call-un section including a call-up mechanism operable for selectively directing the chain driven rollers from the lower rails to the upper rails:

wherein the roller call-up mechanism includes call-up forks; and a tensioning section, the tensioning section having a screw drive connected with the roller take up section to allow an operator to easily loosen and tighten the chain driven rollers as positioned around the roller take up section.

9. The conveyor system as set forth in claim 8, wherein the tensioning section further comprises a rotatable bar that projects laterally from the conveyor system for easy access, the rotatable bar being connected with a gear box that is operably connected with the screw drive.

10. The conveyor system as set forth in claim 9, further comprising a plate affixed with the conveyor system such that the rotatable bar is slideable along the plate between an operating zone and a maintenance zone, such that when in the operating zone, tension of the chain driven rollers is sufficient such that the conveyor system can be operated, and when the rotatable bar is rotated such that tension is released from the chain driven rollers, the rotatable bar is pulled into the maintenance zone.

* * * * *